United States Patent [19]
Henry

[11] Patent Number: 5,722,522
[45] Date of Patent: Mar. 3, 1998

[54] OVERRUNNING MULTIPLE-ROW SPRAG CLUTCH

[75] Inventor: Zachary S. Henry, Forth Worth, Tex.

[73] Assignee: Bell Helicopter Textron, Inc., Hurst, Tex.

[21] Appl. No.: 658,642

[22] Filed: Jun. 5, 1996

[51] Int. Cl.$^6$ .................................................. F16D 41/07
[52] U.S. Cl. ..................... 192/45.1; 192/41 A; 188/82.8
[58] Field of Search ........................... 192/45.1, 41 A; 188/82.1, 82.8

[56] References Cited

U.S. PATENT DOCUMENTS

| | | | |
|---|---|---|---|
| 2,427,120 | 9/1947 | Blair | 192/45.1 X |
| 2,834,445 | 5/1958 | Gorsky | 192/45.1 |
| 3,124,228 | 3/1964 | Candela | 192/45.1 |
| 3,207,278 | 9/1965 | Titt | 192/45.1 |
| 3,498,429 | 3/1970 | Frakes | 192/41.1 |
| 4,130,191 | 12/1978 | Judd et al. | 192/41 A |
| 4,645,047 | 2/1987 | Adolfsson | 192/41 A X |
| 5,002,167 | 3/1991 | Kinoshita et al. | 192/41 A |
| 5,064,037 | 11/1991 | Long, Jr. | 192/41 A |
| 5,485,905 | 1/1996 | Rader, III | 192/41 A X |

OTHER PUBLICATIONS

Zachary S. Henry, NASA Contractor Report 1195479: Bell Helicopter Advanced Rotorcraft Transmission (ART) Program, Jun. 1995, Cover, pp. 25–27, Report Documentation Page.
Declaration of Robert F. Handschuh Regarding NASA–CR–195479 Entitled "Bell Helicopter Advanced Rotorcraft Transmission (ART) Program Final Report," Jul. 8, 1996, pp. 1–3 and Exhibit A.

*Primary Examiner*—Andrea L. Pitts
*Attorney, Agent, or Firm*—Sidley & Austin

[57] ABSTRACT

An overrunning multiple-row sprag clutch is provided comprising an annular outer race, an inner race positioned concentrically within the outer race to define an annular space therebetween, and two or more discrete annular sprag rows, each having a plurality of discrete sprags, positioned longitudinally adjacent to one another in the annular space. The outer race has a longitudinally varying radial stiffness such that when a torque is applied to the clutch, portions of the outer race radially adjacent to each sprag row are deflected radially outward to compensate for the tiling of the sprags in the sprag row caused by torsional wind up of the inner race, thereby evenly distributing the total torque load between the sprag rows. The variable radial stiffness of the outer race may be provided by an outer race having a tapered outer diameter.

15 Claims, 4 Drawing Sheets

OVERRUNNING MULTIPLE-ROW SPRAG CLUTCH

TECHNICAL FIELD OF THE INVENTION

The current invention relates to overrunning sprag clutches for the uni-directional transmission of torque. In one aspect, it relates to an overrunning sprag clutch having multiple sprag rows with novel distribution of torque between the rows.

BACKGROUND OF THE INVENTION

The use of sprag clutches in overrunning applications is well known. Such clutches typically comprise a plurality of generally uniform wedging elements called sprags which are circumferentially distributed about the annular space between an outer race and a concentric inner race. An annular retainer is generally provided for each circumferential row of sprags to maintain the circumferential spacing of the sprags and ensure their axial alignment while, at the same time, allowing each sprag to tilt about an axis parallel to the longitudinal axes of the races. One or more retaining springs are generally provided with each retainer to bias the sprags into contact with the inner and outer races. When the outer race moves relative to the inner race in one direction, the sprags tilt in a direction which causes them to wedge between the inner and outer races, engaging the clutch and allowing the transmission of torque between the races. Movement of the outer race in the opposite direction relative to the inner race tilts the sprags in the opposite direction which releases them from wedging between the inner and outer races, leaving the clutch assembly in overrunning mode where no torque is transmitted.

Helicopters, tilt rotor aircraft and other rotary wing aircraft frequently use multiple engines which are interconnected to a common drive train powering the rotor blades. It is known to provide overrunning sprag clutches in such drive trains to allow an engine to be decoupled from the main drive train if the speed of the engine is below the speed of the drive train. Such clutches allow for sequential starting and shut down of the engines under normal conditions and allow for the emergency shut down of a malfunctioning engine in flight without affecting the operation of the drive train or the other engines. The design of an overrunning sprag clutch for rotary wing applications must take three limiting conditions into account: cold static engagement, cold dynamic engagement, and hot overrunning. The first two conditions relate to operation of the clutch at the low end of its operating temperature range, which may include temperatures as low as −65° C. At such temperatures, the viscosity of lubricating oils within the clutch are extremely high, forming a thick oil film on the surfaces of the races. Cold static engagement relates to the ability of the sprags to penetrate the film of cold oil and wedge between the inner and outer race so as to engage the clutch when neither the inner nor outer race has any significant angular velocity. This would typically occur during start-up of the first engine in arctic conditions. To meet the cold static engagement requirement, a sprag clutch is generally provided with a retainer spring having sufficient static spring force for the sprags to penetrate the oil film and engage the surfaces of the races without assistance from centrifugal forces. Cold dynamic engagement relates to the ability of the sprags to penetrate a cold oil film and engage the clutch when the races have significant angular velocity. This would typically occur when a cold second engine is started and brought up to speed so that it can engage a drive train already being powered by the first engine. In such cases, the static spring force of the retaining spring will be supplemented by centrifugal forces acting on the retaining spring and the sprags themselves (which are typically provided with center of gravity design features known in the art that urge the sprags to wedge between the races when acted upon by centrifugal force). This combined force must be sufficient to overcome both the viscosity of the cold lubricant and any hydrodynamic forces created as the wedging surfaces of the sprags move along the oil film on the inner surfaces of the races. It will be appreciated that cold static engagement performance is generally improved by increasing the static spring force of the retaining spring and cold dynamic engagement performance is generally improved by modifying the sprag design to increase the centrifugal force effects provided by the retaining spring and the sprags.

The remaining limiting condition, hot overrunning, relates to operation of the clutch in the overrunning mode at high speeds and at the high end of its operating temperature range. The hot overrunning performance criteria relates to the ability of the clutch to resist sliding friction damage during high speed overrunning operation. Such sliding friction damage typically takes the form of scoring on the inner race surfaces, which greatly reduces the useful life of the race. It is known that the tendency of a clutch to suffer scoring damage is related to a performance parameter known as the PV product, where P is the "pressure" force exerted on the inner race per unit length of sprag, and V is the surface speed of the inner race relative to the inner surface of the sprags (which generally rotate with the outer race). The P force is produced by both the static spring force and the centrifugal force effects on the spring and on the sprags as the sprags rotate with the outer race. P is therefore related to the square of the angular velocity of the outer race, i.e., the faster the outer race rotates the greater the P force on the inner race exerted by the sprags. V is a linear speed between surfaces, not an angular velocity, therefore V is dependent upon the radius of the inner race as well as the relative angular velocity between the inner and outer race. Thus, for a given clutch, the P force component of PV product has a minimum value when the outer race is stopped and increases to a maximum value when the outer race is rotating at maximum speed. The V component of PV product, on the other hand, has a maximum value when the outer race is stopped, and has a minimum value when the inner race and outer race rotate at the same speed. It has been found that these complementary effects produce a peak PV product where the outer race speed is approximately 67% of the inner race speed such as when a second engine is being brought up to speed so that it can engage an already turning drive train. The problem typically encountered in designing a high speed overrunning sprag clutch is that the clutch can be made to engage at the required extreme of low oil temperature by increasing the static spring force or centrifugal force effects on the sprags, however, these greater sprag forces increase the P force component of the PV product such that the sprags score the inner race when operated at the worst overrunning condition. Conversely, the clutch can be made to operate in the worst overrunning condition without scoring by reducing the P force component, but then it will not engage at low oil temperatures. Forced with such upper and lower limits on the range of spring forces and centrifugal force effects associated with the P force component of the PV product, designers often find they must limit the V component of the PV product to obtain a satisfactory design. The V (velocity) component of PV product may be reduced in one of two ways: reducing the maximum operating speed of the clutch; or reducing the diameter of the clutch, specifically, the diameter of the inner race where it contacts the sprag rows.

Reducing the maximum operating speed of the clutch may have several consequences. It is generally preferred to install the overrunning clutch on a rotary wing aircraft at the engine output, because this is the lowest torque location of the drive train and a clutch with lower torque capacity can generally be smaller than a clutch with higher capacity. However, if the maximum speed of the clutch is limited, such as for PV product reasons, then it may be necessary that the clutch be installed at locations other than the engine output. Locations other than the engine output are lower speed and therefore higher torque resulting in a heavier clutch assembly than would be required at the high speed, low torque engine output location. Clutch assemblies located in places other than the engine output are also usually more inaccessible and therefore more difficult to maintain.

The alternative approach to reducing the V component of the PV product is to reduce the diameter of the clutch at the inner race/sprag row interface. By distributing the total torque load of the clutch over multiple sprag rows, each sprag row may carry less torque so that a smaller diameter sprag row can be used. Theoretically, any number of sprag rows could be used to provide a clutch having the desired maximum PV product without sacrificing maximum operating speed. However, while the advantages of using a smaller diameter clutch at high speeds was known, conventional sprag clutches used in the aircraft industry have used at most two sprag rows. This is because of uncertainties and difficulties involving the uniform distribution of load between the sprag rows.

As previously discussed, in a multiple row sprag clutch, it is desirable to transmit the torque equally through all the sprag rows so that each row can be as small as possible. For example, if ideal load distribution is achieved, each row of a two row clutch could be sized to handle 50% of the total torque, each row of a four row clutch could be sized to handle 25% of the total torque, etc. This goal of equal load distribution in multiple row sprag clutches has been problematic, however, because of the interrelationships between the torque transmitted through each sprag row, the "wind-up" of the inner race adjacent to each sprag row, the compression of the sprags in a given sprag row, and the relative motion of the inner and outer races at each sprag row. When the outer race of a typical sprag clutch moves relative to the inner race in the torque-transmitting direction, the curved surfaces of the inner and outer ends of each sprag initially wedge in non-sliding engagement with the inner and outer races, respectively. This initial engagement occurs with essentially zero torque transmitted between the races. After initial engagement, however, continued movement of the races relative to one another in the torque transmitting direction causes the curved surfaces of the inner and outer ends of each sprag to roll in continuous contact along the inner and outer races, respectively, changing the tilt angle of the sprag in relation to the radial direction. This tilting causes an increase in the "effective height" of the sprag, i.e., the height of the sprag at a given tilt angle under conditions of no load. Confined between the inner and outer races, however, the sprag cannot achieve its effective height, rather, it is subjected to increasing force from the outer race which tends to compress the sprag. The increasingly compressed sprag, in turn, presses with increasing force on the inner race, resulting in greater torque being transmitted through the sprag row. Thus, relative motion between the inner and outer race tilts and compresses the sprags to transmit torque.

Simultaneously with the compressing of the sprags due to relative motion between the inner and outer races, the inner race is "winding up" in response to the torque transmitted to it through each sprag row. All shafts twist, or wind up, when subjected to torsional loads. The exact amount of wind up depends upon the specific characteristics of the shaft and distribution of loads along the shaft. In the case of sprag clutches, however, all significant wind up occurs in the inner race. This is because the stiffness of a shaft having diameter d is proportional to $d^3$. Thus, the outer race of a sprag clutch is typically so much stiffer in torsion than the inner race that the outer race can be considered torsionally rigid. Where the inner race of a sprag clutch has a single output torque applied at one end and several input torques applied along its length at each sprag row, the wind up is generally progressive from the output end of the shaft to the location of the farthest sprag row. This progressive wind up characteristic of the inner shaft is problematic when trying to evenly load a multiple row sprag clutch as follows: twisting the outer race so that the first sprag row (the one closest to the output end of the inner race) is loaded to the appropriate torque level leaves each of the remaining sprag rows progressively more underloaded, while conversely, twisting the outer race so that the last sprag row (i.e., the sprag row farthest from the output end of the inner race) is loaded to the appropriate torque level leaves the other sprag rows progressively overloaded. Recognizing this "mismatch" of torque loading, designers of high torque overrunning sprag clutches have heretofore limited their designs to two row clutches, since in two row clutches the inner race is relatively short, minimizing the wind up differential between rows and thus the difference in torque loading between sprag rows.

Without good torque distribution between sprag rows, designers can get little benefit from conventional multiple row sprag clutches having more than two rows. For example, although each row of a two row clutch would theoretically carry 50% of the total torque, a conventional two row sprag clutch would probably be designed with each row sized to handle at least 60% of the overall load since the first row will carry more than one-half of the total torque due to considerations related to inner race wind up. Similarly, each row of a four row clutch would theoretically carry 25% of the total torque, however, in a conventional sprag clutch design, if four rows are used, each row would probably be sized for 50-60% of the overall load because the longer four row inner race will experience considerably more windup than the two row race. The loading differential between the first and last sprag rows will be considerably greater with the four row clutch than with a two row clutch, with the first row handling a disproportionate share of the overall load. Thus, there is little design incentive for the designer to use a multiple row clutch having more than two rows because the added cost, complexity and length of these multi-row clutches results in only a marginal decrease in the diameter of the clutch when compared to the two row clutch having the same capacity. A need therefore exists for a multiple row sprag clutch with improved load distribution between sprag rows.

SUMMARY OF THE INVENTION

The present invention provides an overrunning sprag clutch for the unidirectional transmission of torque between an input shaft and an output shaft, the clutch comprising an annular outer race, an inner race, and a plurality, i.e., two or more discrete annular sprag rows. The annular outer race has a longitudinal axis therethrough and is adapted for connection to the input shaft. The inner race is positioned concentrically within the outer race forming an annular space therebetween and has an output end adapted for connection to the output shaft. The plurality of discrete annular sprag rows are positioned longitudinally adjacent to one another in the annular space. In a preferred embodiment, four sprag rows are provided. Each sprag row comprises a plurality of individual sprags and is adapted to produce a running fit between the sprag row and the inner and outer races upon rotation of the inner race relative to the outer race in one direction, to allow overrunning, and to produce a wedging fit between the sprag row and the inner and outer races upon rotation of the inner race relative to the outer race in the opposite direction to transmit a torque between the inner and outer races. The outer race has a range of values for its radial stiffness. These values for radial stiffness vary in the longitudinal direction from a low stiffness value at a first location on the outer race to a high stiffness value at a second location on the outer race. The first location is positioned between the second location and the output end of the inner race. The variable radial stiffness of the outer race allows different radial "hoop" deflections in the outer race adjacent to each sprag row to compensate for different tilting of the sprags in each sprag row caused by the progressive torsional wind up of the inner race, thereby more evenly distributing the transmitted torque across the multiple sprag rows. A clutch according to the current invention can therefore be produced having more than two sprag rows with improved distributions of torque between the rows. The clutch of the current invention provides this improved distribution of loads while using multiple sprag rows which are identical. Thus, overrunning sprag clutches having two, three, four or more identical sprag rows may be produced for high speed, high torque applications or other applications where a limited PV product is required.

In a preferred embodiment of the current invention, each sprag row further comprises a plurality of substantially uniform sprags distributed in the annular space between the inner and outer races, an annular retainer adapted to maintain the circumferential spacing and longitudinal alignment of the sprags, and a retaining spring biasing the sprags into tilting to contact the inner and outer races. In this preferred embodiment, each sprag has an inner and outer end adjacent to the inner and outer races, respectively, and each of the inner and outer ends of the sprags have respective curved surfaces. These surfaces are shaped to reduce the effective height (i.e., the height of the sprag under no load conditions) when the sprag is tilted in one direction, and to increase the effective height of the sprag when the sprag is tilted in the other direction. Upon rotation of the inner race relative to the outer race in one direction, the sprags are tilted to reduce their effective height to produce a running fit between the sprag, inner, and outer races to allow overrunning. Upon rotation of the inner race relative to the outer race in the opposite direction, the sprags are tilted to increase the effective height of the sprags to cause wedging of the sprags between the inner and outer races and transmitting of torque between the inner and outer races. The magnitude of the transmitted torque increases as the sprags are compressed, i.e., as ratio of the actual height of the sprag to the effective height of the sprag at the same tilt angle decreases. After initial engagement, increasing relative rotation between the outer and inner races in the torque transmitting direction will cause the sprags to tilt such that their effective height increases and, being confined between the inner and outer races, the sprags are increasingly compressed between the inner and outer races to an actual height less than their effective height for the same tilt angle. In the current invention, however, since the outer race has a variable radial stiffness, different radial hoop deflections of the outer race will occur adjacent to different sprag rows, resulting in less compression of some sprags as their effective height increases, and thus reducing the torque transmitted through those rows to provide for more uniform distribution of torque between the multiple sprag rows.

In a more preferred embodiment of the current invention, the outer race has a tapered outer diameter. The outer diameter ranges from a first diameter value at a first location on the outer race to a second diameter value at a second location on the outer race, and the first location is positioned between the second location and the output end of the inner race.

In yet another embodiment of the current invention, the sprag clutch further comprises a pair of overrunning bearings positioned in the annular space between the inner and outer race. A first bearing of the pair is positioned between the output end of the inner race and the sprag rows. A second bearing of the pair is positioned on the side of the sprag rows opposite from the output end. In this embodiment, it is preferred that an overrunning bearing is not interposed between any pair of sprag rows.

BRIEF DESCRIPTION OF THE DRAWINGS

FIG. 4a is a section viewed along line 4a—4a of FIG. 1 through the sprag row closest to the output end of the inner race;

FIG. 4b is a section taken along line 4b—4b of FIG. 1 through the sprag row second closest to the output end of the inner race;

FIG. 4c is a section taken along line 4c—4c of FIG. 1 taken through the sprag row third closest to the output end of the inner race;

FIG. 4d is a section taken along line 4d—4d of FIG. 1 through the sprag row fourth closest to the output end of the inner race;

DETAILED DESCRIPTION

Figure 1:
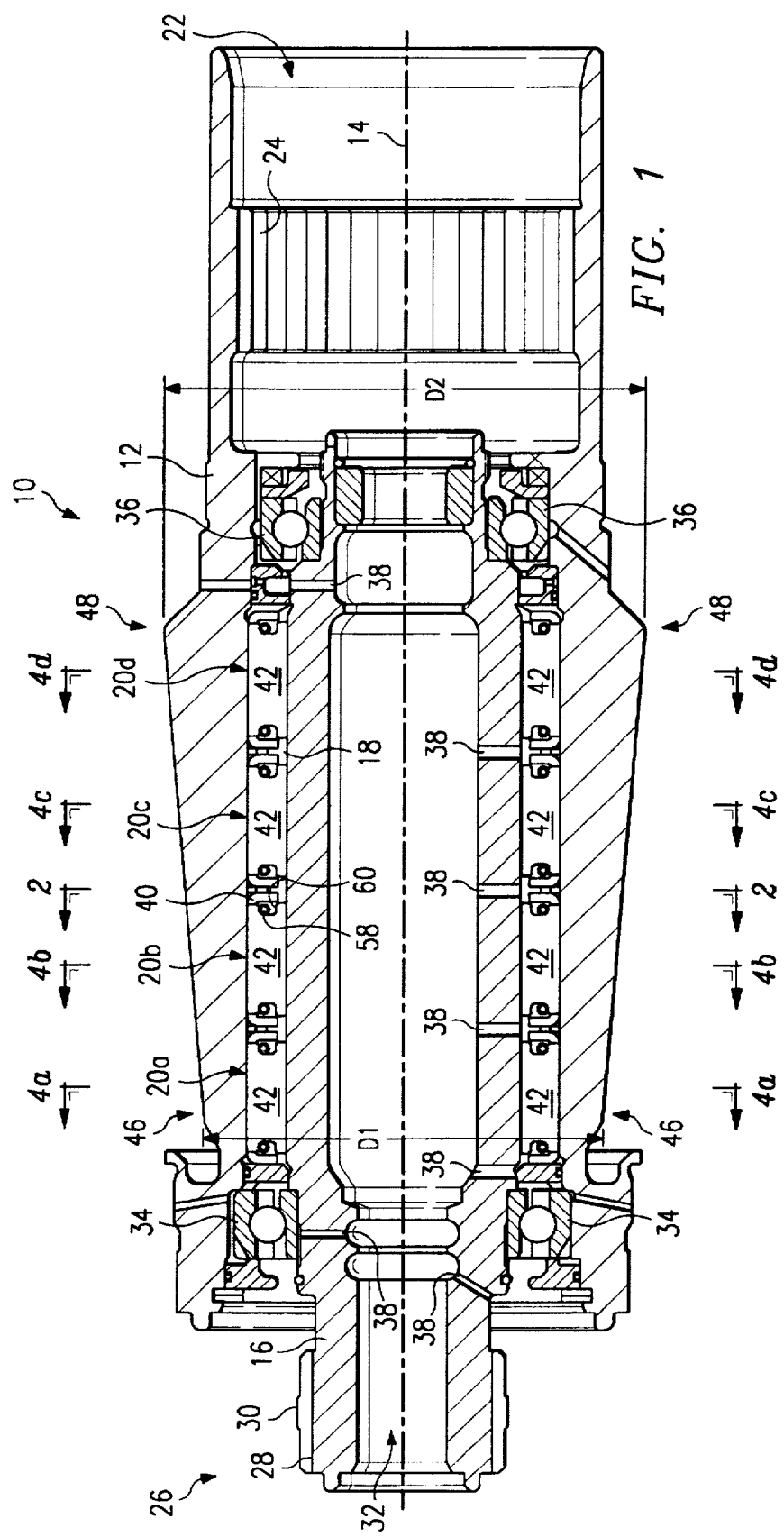
FIG. 1 is a cross-sectional side elevation view of an overrunning multiple row sprag clutch according to one aspect of the current invention having four sprag rows.

Referring to FIG. 1, a multiple row overrunning sprag clutch 10 is provided according to one embodiment of the current invention. Clutch 10 has an outer race 12 having a longitudinal axis 14 therethrough, an inner race 16 positioned concentrically within outer race 12 forming an annular space 18 therebetween, and a plurality, i.e., two or more annular sprag rows 20 positioned longitudinally adjacent to one another in annular space 18. In a preferred embodiment, four sprag rows are provided and in the embodiment of FIG. 1, four identical sprag rows, 20a, 20b, 20c and 20d, are provided. Outer race 12 is adapted for connection to an input shaft (not shown). In the embodiment shown, outer race 12 is provided with a socket 22 having internal crowned splines 24 which can receive torque from the input shaft. Those skilled in the art will readily appreciate that outer race 12 could be adapted for connection to the input shaft using any one of a variety of known mechanical connections. Inner race 16 has an output end 26 adapted for connection to an output shaft (not shown). In the embodiment shown, output end 26 is provided with a quill 28 having external crowned splines 30 for the transmission of torque to the output shaft. As with outer race 12, those skilled in the art will readily appreciate that any of a variety of known mechanical connections could be used to adapt output end 26 for a torque transmitting connection to the output shaft. In the embodiment shown in FIG. 1, the input end of outer race 12 and output end 26 of inner race 16 are positioned at opposite ends of longitudinal axis 14. When the clutch of FIG. 1 is engaged and in driving mode, the connection structure shown in FIG. 1 effectively isolates clutch 10 as a single piece shaft supported by crowned splines on both ends to allow for misalignment. A central oil passage 32 is formed through inner race 16 along longitudinal axis 14. While central oil passage 32 is not required, it is preferred as it provides a convenient means for lubricating sprag rows 20, overrunning bearings 34, 36 and other clutch components by means of lateral oil passages, shown generally as 38.

Figure 2:
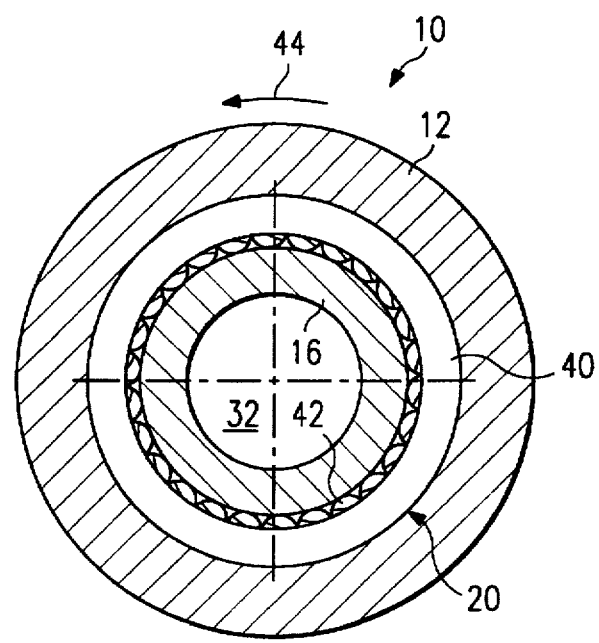
FIG. 2 is a cross-sectional endwise view of the clutch of FIG. 1 taken along line 2—2 of FIG. 1.

Referring now to FIG. 2, a cross-sectional end view of overrunning clutch 10 is shown viewed along line 2—2 of FIG. 1. Inner race 16 is positioned concentrically within outer race 12. Sprag row 20, comprising annular retainer 40 and a plurality of sprags 42, is positioned in the annular space 18 (best seen in FIG. 3) between inner race 16 and outer race 12. Sprag row 20 is adapted to produce a wedging fit between sprag row 20 and outer and inner races 12, 16 upon rotation of outer race 12 relative to inner race 16 in the direction indicated by arrow 44 to transmit a torque between outer and inner races 12, 16. Sprag row 20 is further adapted to produce a running fit between sprag row 20 and outer and inner races 12, 16 upon rotation of outer race 12 relative to inner race 16 in the direction opposite that shown by arrow 44, to allow overrunning.

Figure 3:
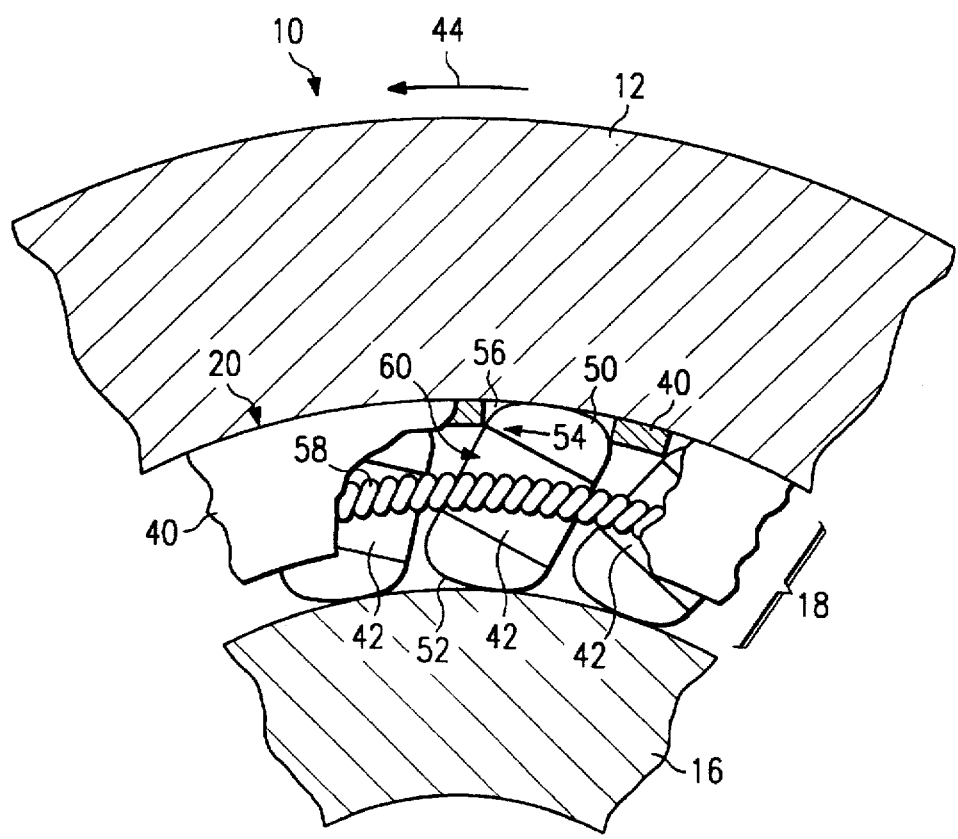
FIG. 3 is a partial sectional view of the clutch taken along the same section line 2—2 of FIG. 1, but having part of the retainer broken away showing the sprags and retaining spring.

Referring to FIG. 3, an enlarged view of a cross-sectional end view of clutch 10 is shown, similar to FIG. 2, but with retainer 40 partially broken away to show the internal arrangement of a typical sprag row. Sprag row 20 comprises a plurality of substantially uniform sprags 42 distributed in annular space 18 between outer race 12 and inner race 16. The exact number and configuration of sprags 42 is determined according to principles known in the art for designing sprag clutches. Each sprag 42 has an outer end 50 and an inner end 52 adjacent to outer and inner races 12, 16, respectively. Outer and inner ends 50, 52 have respective curved surfaces shaped to increase the sprags effective height (i.e., the height that the sprag would have in the radial direction under conditions of no load) when the sprag is tilted in the direction shown by arrow 54 and to decrease the sprags effective height when the sprag is tilted opposite the direction shown by arrow 54. When outer race 12 is rotated relative to inner race 16 in the direction shown by arrow 44, frictional forces between the races and the curved surfaces 50 and 52 tilt the sprag in the direction shown by arrow 54 until the effective height of sprag 42 exceeds the actual height of annular space 18, at which point sprag 42 wedges between the races, engaging the clutch in driving mode. As outer race 12 continues to move in the direction of arrow 44 relative to inner race 16, sprags 42 will increasingly tilt in the direction shown by arrow 54 such that their effective height will continue to increase. However, since sprags 42 are confined between outer race 12 and inner race 16, sprags 42 cannot attain their effective height and instead are compressed to a fraction of their effective height. The torque transmitted between outer race 12 and inner race 16 increases as the ratio of the sprags actual height to its effective height decreases, i.e., the greater the compression of the sprags, the greater the transmission of torque between outer race 12 and inner race 16. An annular retainer 40 having a plurality of circumferentially spaced slots 56 is provided to maintain the circumferential spacing and longitudinal alignment of sprags 42. The exact configuration of retainer 40 is determined according to the principles known to those skilled in the art. A retaining spring 58 is provided biasing sprags 42 into tilting to contact the inner and outer races. In the embodiment shown in FIGS. 1 and 3, retaining spring 58 comprises a compressed garter spring positioned in a slot 60 (best seen in FIG. 1) formed in the end of each sprag, however, those skilled in the art will readily appreciate that a variety of spring configurations could be used to bias sprags 42 into tilting to contact inner and outer races 16, 12 without departing from the scope of the current invention.

A novel aspect of the current invention relates to the variable radial stiffness of outer race 12. The radial stiffness of a race relates to its resistance to "hoop" deflections, i.e., radial deflections in a "hoop" or "ring" of the race intersected by a plane formed perpendicular to longitudinal axis 14 through a given point along longitudinal axis 14. The radial stiffness of the outer and inner races affects the degree to which the sprags in a sprag row are compressed when the effective height of a sprag increases due to tilting caused by relative motion between outer and inner races in the torque-transmitting direction when the clutch is engaged in driving mode. Referring again to FIG. 1, outer race 12 of the current invention has a range of values for radial stiffness, these values varying in the longitudinal direction, i.e., in the direction parallel to longitudinal axis 14. The values for radial stiffness vary from a low value at a first location 46 on outer race 12 to a high value at a second location 48 on outer race 12, where first location 46 is between second location 48 and output end 26 of inner race 16 in the longitudinal direction. Those skilled in the art will appreciate that the input end of outer race 12 can be located at either end of outer race 12 provided the variable radial stiffness of outer race 12 has its low value located longitudinally between output end 26 and the location of its high value.

In the embodiment of the current invention shown in FIG. 1, outer race 12 has a tapered outside diameter ranging in value from a first value D1 at first location 46 on outer race 12 to a second value D2 at second location 48 on outer race 12, second value D2 being greater than first value D1. While outer race 12 having a tapered outside diameter is one embodiment providing an outer race having a radial stiffness varying in the longitudinal direction, those skilled in the art will readily appreciate that an outer race 12 having a radial stiffness varying in the longitudinal direction could be provided using other design approaches without departing from the scope of the current invention including an outer race having a longitudinally "stepped" outside diameter or an outer race of constant outside diameter provided with reinforcements of circumferentially wrapped composite material at selected longitudinal positions.

Figure 4A:
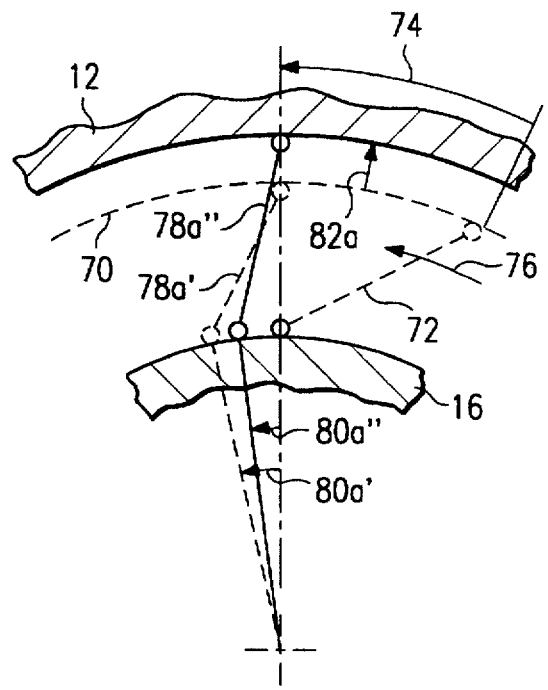
FIGS. 4a–d are partial cross-sections of a four row clutch according to the current invention with idealized representations of a single sprag element shown in initial and final states illustrating the load distribution aspects of the invention.
Figure 4B:
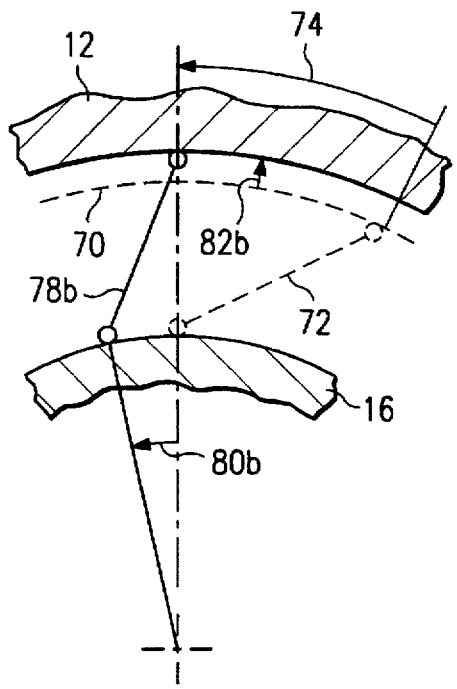
Figure 4C:
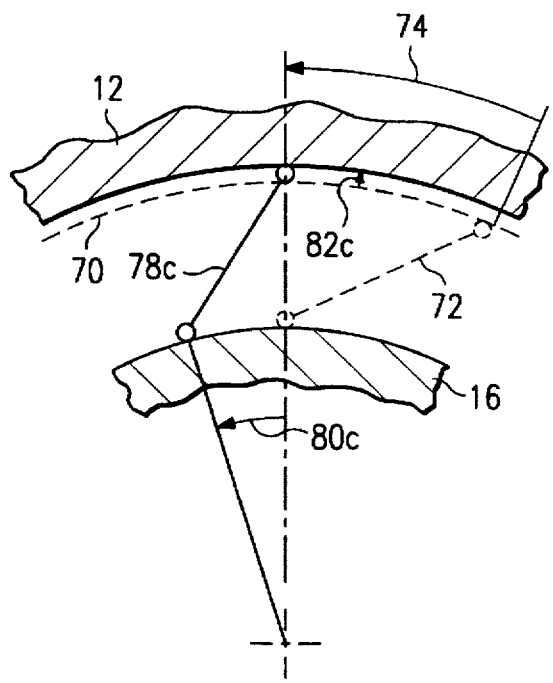
Figure 4D:
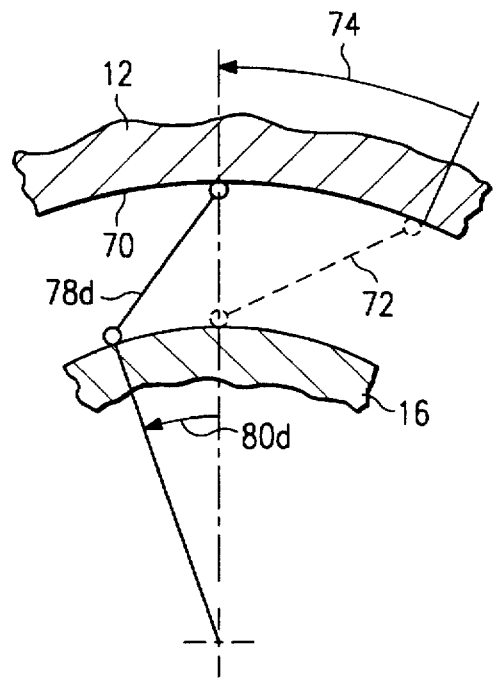

The variable radial stiffness of outer race 12 provides novel load distribution characteristics for the current invention. Referring now to FIGS. 4a–d, simplified cross-sectional end views of clutch 10 are shown taken along lines 4a—4a, 4b—4b, 4c—4c, and 4d—4d of FIG. 1 taken through sprag rows a, b, c and d, respectively. In each figure, a portion of outer race 12 and inner race 16 are shown (not to scale) along with a stylized representation (not to scale) of a sprag in its initial position 72 where the sprag is engaged with the inner and outer races but is not transmitting torque and a final position 78 showing how the relative movement between the inner and outer races has caused the sprag to rotate and move as torque is transmitted from the outer to inner races. Referring to FIG. 4a, when no torque is applied to the clutch, outer race 12 at sprag row a is in the radial position shown by datum line 70 (shown in phantom) and the uncompressed sprag is shown in initial position 72 (shown in phantom). When a torque is applied, outer race 12 moves through an angle as shown by arrow 74. This causes the sprag at initial position 72 to simultaneously tilt in the direction shown by arrow 76 and move to a final position shown as 78a. If outer race 12 is relatively stiff in the radial direction, then outer race 12 will have no significant "hoop" deflection in the radial direction. The sprag will thus be compressed to a height determined by the space between datum line 70 and inner race 16 as shown in final position 78a' (shown in phantom) and transmit torque to inner race 16 in response to this compression. The torque transmitted to inner race 16 will simultaneously cause the inner race to "wind up" through a wind up angle 80a' (shown in phantom) proportional to the torque transmitted. Alternatively, if outer race 12 is relatively flexible in the radial direction, the tilting of the sprag from initial position 72 will produce a hoop deflection 82a (in the radial direction) in outer race 12. Because of hoop deflection 82a, the sprag will be compressed to the height as shown in alternative position 78a" and, because it is compressed less than the sprag in position 78a', the alternative sprag at position 78a" will transmit less torque to inner race 16 even though outer race 12 moves through the same angle 74 as it did for the sprag at the position 78a'. Inner race 16, driven by the lower torque from the sprag at alternative position 78a" will, in turn, wind up through a smaller alternative wind up angle 80a". Thus, the radial hoop deflection 82a of outer race 12 has served to "unload" inner race 16 and affect wind up angle 80 of inner race 16.

Referring now to FIGS. 4a–d, by providing outer race 12 with different radial stiffness at sprag rows a, b, c, and d, radial deflections 82a, 82b, 82c, and 82d at each respective sprag row can be selectively varied to accommodate the desired progressive wind up 80a", 80b, 80c, and 80d of inner race 16 needed to evenly load the inner race while simultaneously providing final sprag locations 78a", 78b, 78c, and 78d that result in equal amount of sprag compression for each sprag row, and thus, an equal amount of torque transmitted through each sprag row.

Figure 5:
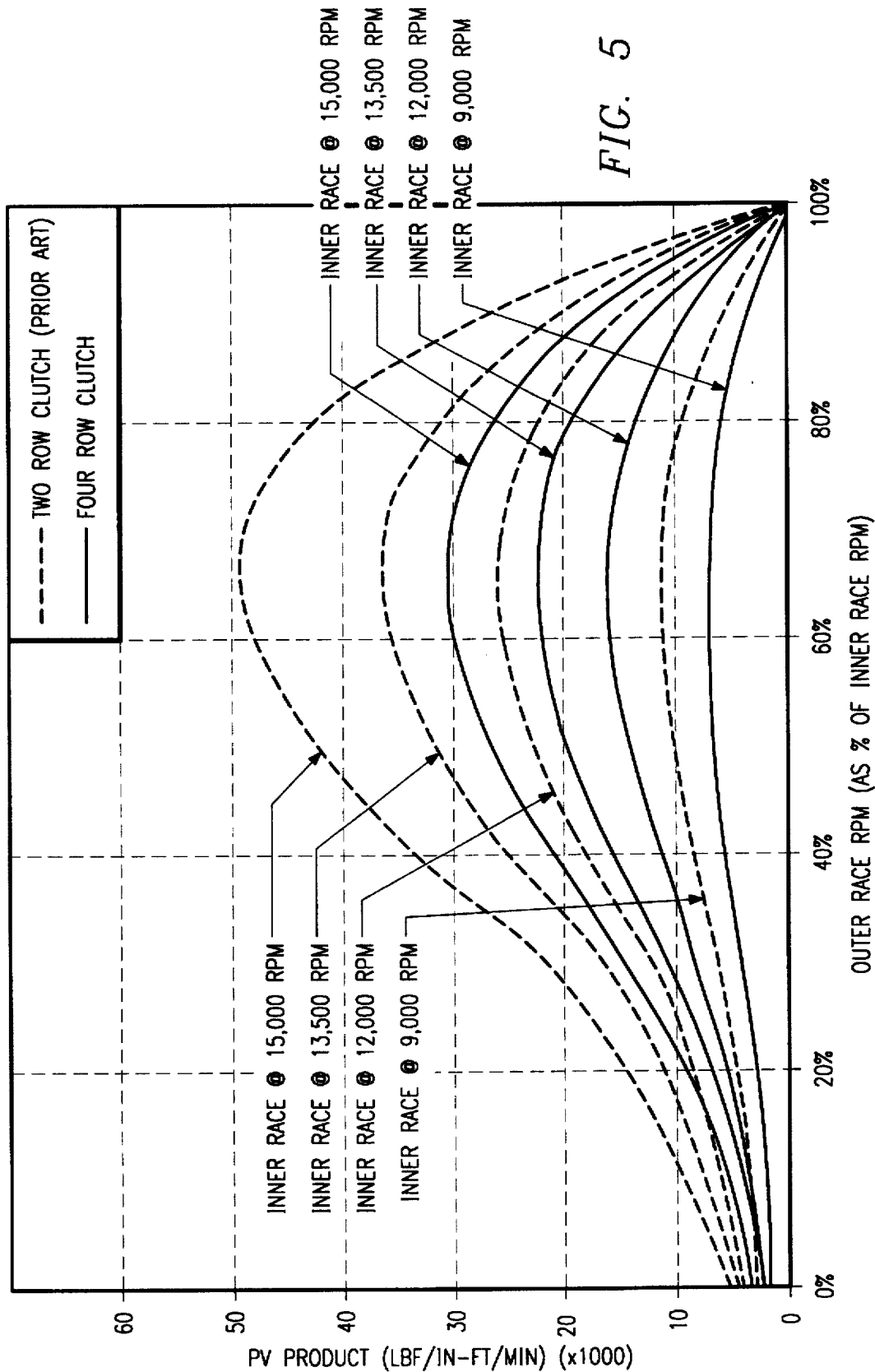
FIG. 5 is a graph showing the PV product versus outer race angular speed as a percent of inner race angular speed for a number of discrete inner race annular speeds, values are shown for conventional two row sprag clutch (prior art) and for a four row clutch according to one aspect of the current invention.

By providing a sprag clutch having an outer race with radial stiffness varying in the longitudinal direction, the novel load distribution characteristics of this clutch allow designers to take full advantage of the reduced sprag row diameters made available by multiple row designs. While the current invention is applicable for use on two and three row sprag clutches, the benefits are more apparent on clutches having four or more rows. For example, referring now to FIG. 5, a graph is shown of the PV product versus outer race RPM as a percent of inner race RPM for various values of inner race RPM. Values are shown for a conventional overrunning clutch having two sprag rows and for an overrunning clutch according to a preferred aspect of the current invention having four sprag rows designed for the same torque capacity. The PV product is known to correlate with the likelihood of damage to the inner race by scoring during overrunning. Values at the left end of the scale represent the PV product for the situation where the outer race is stopped and the inner race is turning at a given speed. This situation would typically occur in a multi-engine aircraft where a first engine had been started, bringing the drive train up to speed and causing overrunning of the clutch of the second engine which had not yet been started. In such cases, the relative velocity component V of the PV product is maximized because the outer race is not turning, however, the pressure force component P of the PV product is minimized because there are no centrifugal forces acting upon the sprags since the outer race is not turning. As the second engine is brought up to speed, the V component of the PV product will be reduced as the relative velocity between the inner and outer races is reduced, however, the P component will rapidly increase since the centrifugal force effects on the sprags are proportional to the square of the angular velocity of the outer race. This is shown in the central portion of FIG. 5. It has been found that the PV product typically reaches a maximum value when the outer race is turning at approximately 68% of the speed of the inner race. After this point, although the P component of the PV product continues to increase as the speed of the outer race increases, the V component approaches zero as the speed of the outer race approaches the speed of the inner race. When the speed of the outer race reaches the speed of the inner race, both the V and the PV product itself go to zero as the clutch leaves overrunning mode and enters the engaged torque-transmitting mode. As shown in FIG. 5, the two row clutch experiences a maximum PV of approximately 49,000 lb/inches-foot/min. at an inner race speed of 15,000 RPM and an outer race speed at 68% of the inner race speed. In comparison, the four row clutch having the same torque capacity experiences a maximum PV product of approximately 30,500 lb/inches-foot/min. for the same inner race speed of 15,000 RPM and an outer race speed of 68% of the inner race speed. Thus, the four row clutch provides approximately 38% decrease in the maximum PV product for the same torque capacity and RPM conditions. Thus, by using a four row clutch the likelihood of inner race scoring can be greatly reduced for a given maximum operating RPM. Alternatively, the four row clutch could be operated at a much higher RPM (estimated at approximately 25,000 RPM) without exceeding the PV product experienced by the two row clutch and thus not increasing the likelihood of inner race damage due to scoring.

Referring again to FIG. 1, in another aspect of the current invention, overrunning sprag clutch 10 further comprises a pair of overrunning bearings 34, 36 positioned in annular space 18 between outer race 12 and inner race 16. The first bearing 34 of the pair is positioned between output end 26 of inner race 16 and sprag rows 20. The second bearing 36 is positioned on the opposite side of sprag rows 20 from output end 26. In a preferred embodiment, sprag clutch 10 has no overrunning bearings interposed between any pair of sprag rows 20. The absence of support bearings interposed between sprag rows 20 simplifies assembly and disassembly of clutch 10, isolates the clutch assembly as a single piece shaft in the driving mode, and eliminates structures which could interfere with the desired radial "hoop" deflection of the outer race necessary to unload the sprag rows to accommodate inner race wind up and evenly distribute the transmitted torque across the multiple sprag rows.

While presently preferred embodiments of the invention have been illustrated and described, it will be understood that the invention is not limited thereto, but may be otherwise variously embodied within the scope of the following claims.

I claim:

1. An overrunning sprag clutch for the unidirectional transmission of torque between an input shaft and an output shaft, said clutch comprising:

(a) an annular outer race having a longitudinal axis therethrough and having an input end;

(b) an inner race positioned concentrically within said outer race forming an annular space therebetween and having an output end;

(c) a plurality of discrete annular sprag rows; said sprag rows positioned longitudinally adjacent to one another in said annular space, each said sprag row adapted to produce a running fit between said sprag row and said inner and outer races upon rotation of said inner race relative said outer race in one direction, to allow overrunning, and to produce a wedging fit between said sprag row and said inner and outer races upon rotation of said inner race relative to said outer race in the opposite direction to transmit a torque between said inner and outer races; and (d) said outer race having a range of values for its radial stiffness, said values varying in the longitudinal direction from a low value at a first location on said outer race to a high value at a second location on said outer race, said first location being longitudinally between said output end and said second location.

2. An overrunning sprag clutch according to claim 1 wherein the number of sprag rows is two or more.

3. An overrunning sprag clutch according to claim 2 wherein said sprag rows are identical.

4. An overrunning sprag clutch according to claim 1 wherein said input end of said outer race and said output end of said inner race are positioned at opposite ends of the longitudinal axis of said clutch.

5. An overrunning sprag clutch according to claim 4 wherein said first location on said outer race of said low value of radial stiffness is longitudinally proximate said output end of said inner race, and said second location on said outer race of said high value of radial stiffness is longitudinally proximate said input end of said outer race.

6. An overrunning sprag clutch according to claim 2 wherein the number of sprag rows is 4.

7. An overrunning sprag clutch according to claim 6 wherein said sprag rows are identical.

8. An overrunning sprag clutch according to claim 1 wherein each said sprag row further comprises:

(a) a plurality of substantially uniform sprags distributed in said annular space; each said sprag having an inner and an outer end adjacent to said inner and outer races, respectively; each of said inner and outer ends of said sprag having respective curved surfaces shaped to reduce the effective height of said sprag by tilting the sprag in one direction upon rotation of said inner race relative to said outer race in one direction, to produce a running fit between the sprag, inner, and outer races to allow overrunning, and to increase the effective height of said sprag by tilting the sprag in the other direction upon rotation of said inner race relative to said outer race in the opposite direction, to cause wedging of said sprag between said inner and outer races and transmitting of a torque between said inner and outer races, the magnitude of said torque increasing as the ratio of the actual height of said sprag to the effective height of said sprag at the same tilt angle decreases;

(b) an annular retainer adapted to maintain the circumferential spacing and longitudinal alignment of said sprags; and (c) a retaining spring biasing said sprags into tilting to contact said inner and outer races.

9. An overrunning sprag clutch according to claim 1 wherein said outer race has a tapered outer diameter, said diameter ranging in value from a first diameter at a first location on said outer race to a second diameter at a second location on said outer race said second diameter being greater than said first diameter, and said first location positioned longitudinally between said output end and said second location.

10. An overrunning sprag clutch according to claim 1 further comprising a pair of overrunning bearings positioned in said annular space, a first bearing of said pair positioned between said output end of said inner race and said sprag rows and a second bearing of said pair positioned on the opposite side of said sprag rows from said output end.

11. An overrunning sprag clutch according to claim 10 wherein an overrunning bearing is not interposed between any pair of sprag rows.

12. An overrunning sprag clutch for the unidirectional transmission of torque between an input shaft and an output shaft, said clutch comprising:

(a) an annular outer race having first and second ends and a longitudinal axis therethrough; said first end being an input end;

(b) an inner race having third and fourth ends and positioned concentrically within said outer race; said third end being an output end;

(c) a plurality of annular sprag rows positioned longitudinally adjacent to one another in said annular space, each said sprag row including:

an annular retainer having a plurality of substantially uniformly spaced sprag openings formed therein;

a plurality of sprags substantially uniformly distributed in said annular space, each said sprag extending through one said sprag opening and having an inner and an outer end adjacent to said inner and outer races respectively, each of said sprag's inner and outer ends having respective curved surfaces shaped to reduce the effective height of each of said sprags by tilting of the sprags in one direction upon rotation of said outer race relative said inner race in one direction, to allow overrunning, and to increase the effective height of said sprags by tilting of the sprags in the other direction upon relative rotation of said outer race in the opposite direction to cause wedging of said sprags between said inner and outer races for the transmission of torque; and a retaining spring biasing said sprags into tilting in the other direction to urge said sprags into contact with said inner and outer races;

(d) said outer race having a range of values for radial stiffness which are, in the circumferential direction, substantially uniform, and which are, in the longitudinal direction, progressively variable from a high value at a first location on said outer race to a low value at a second location on said outer race, said first location being longitudinally between said third end and said second location.

13. An overrunning sprag clutch according to claim 12 wherein the number of annular sprag rows is 4.

14. An overrunning sprag clutch according to claim 13 wherein the torque transmitted from said outer race to said inner race by each said sprag row is less than about 35% of the total torque transmitted from said outer race to said inner race.

15. An overrunning sprag clutch according to claim 12 wherein, when a torque is applied to said clutch at said input end and said output end, portions of said outer race radially adjacent to each said sprag row are deflected radially outward to compensate for the tiling of the sprags in said sprag row caused by torsional wind up of said inner race whereby the value of torque transmitted from said outer race to said inner race by each sprag row is within the range of about 90% to about 110% of the value of torque transmitted by any other sprag row.

* * * * *